July 21, 1925. 1,546,448
C. W. HOTTMANN
CUTTING MACHINE WITH A SAFETY FEED
Filed Oct. 3, 1924 2 Sheets-Sheet 1
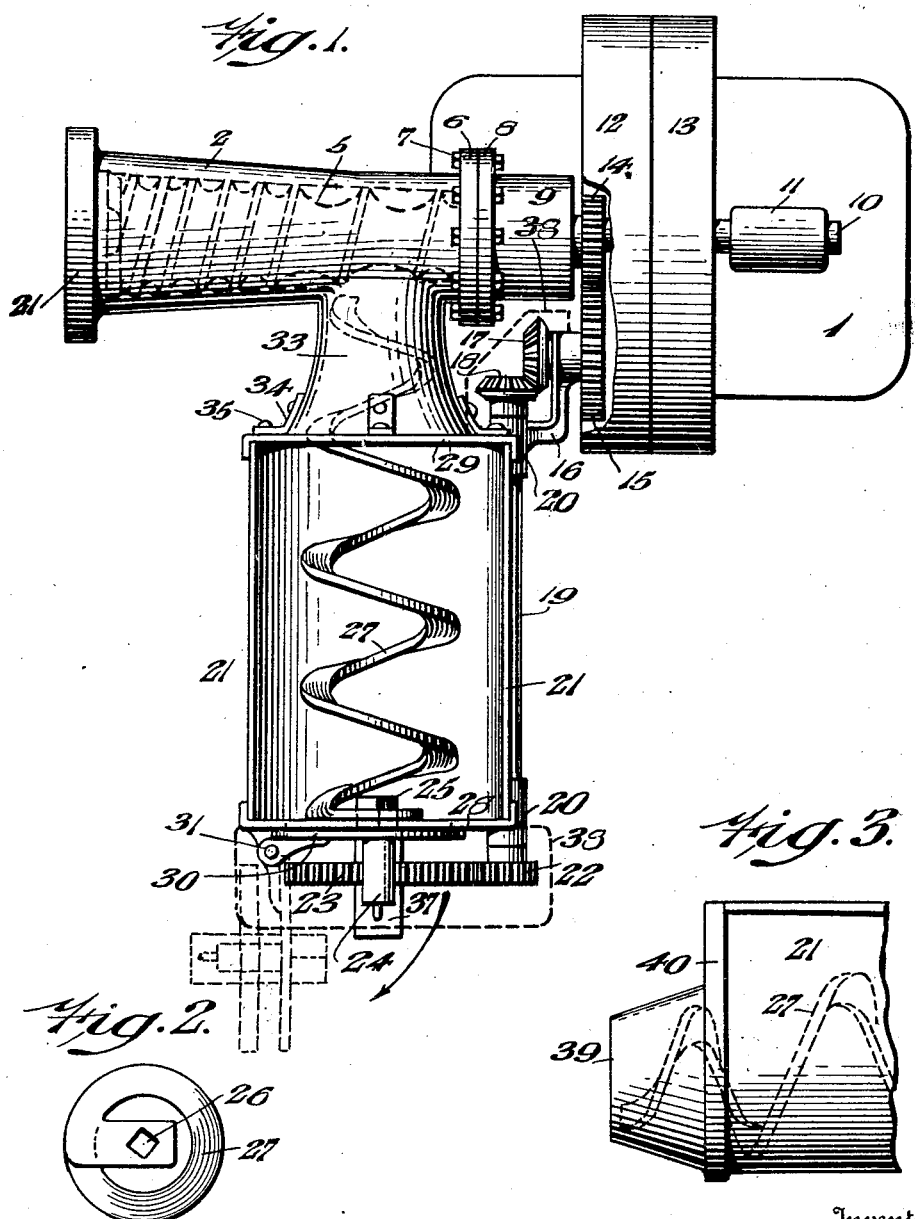

July 21, 1925.
C. W. HOTTMANN
1,546,448
CUTTING MACHINE WITH A SAFETY FEED
Filed Oct. 3, 1924  2 Sheets-Sheet 2
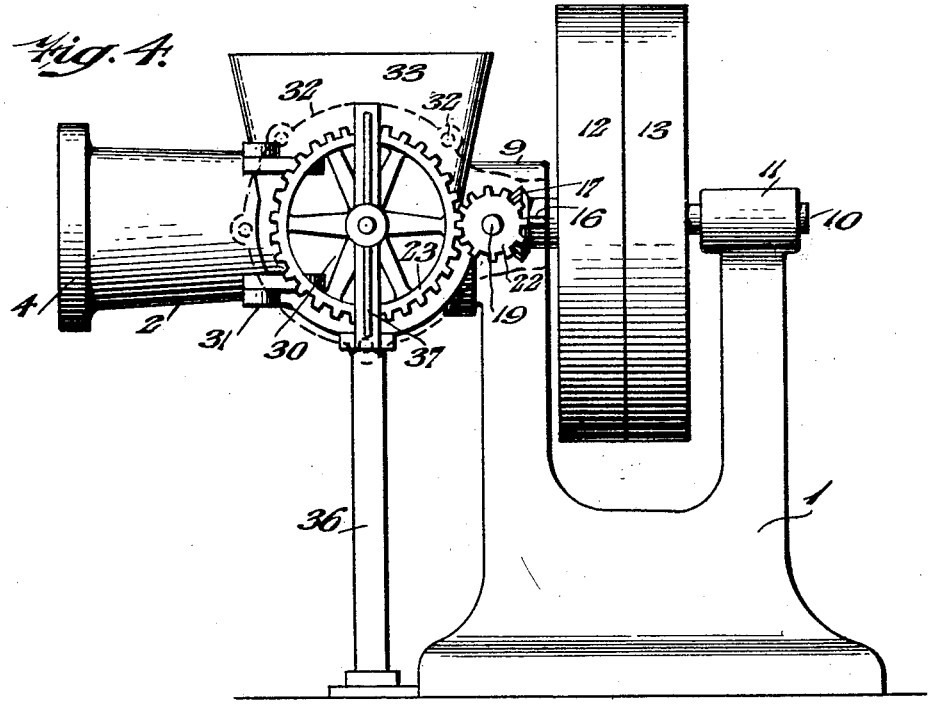
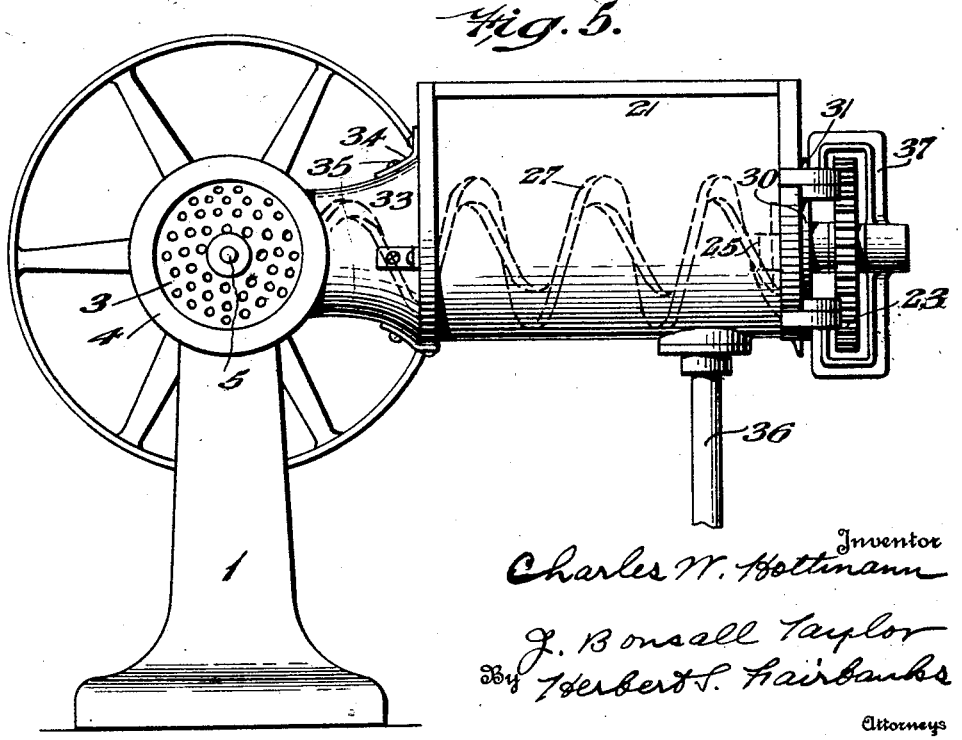

Patented July 21, 1925.

1,546,448

UNITED STATES PATENT OFFICE.

CHARLES W. HOTTMANN, OF PHILADELPHIA, PENNSYLVANIA.

CUTTING MACHINE WITH A SAFETY FEED.

Application filed October 3, 1924. Serial No. 741,344.

*To all whom it may concern:*

Be it known that I, CHARLES W. HOTT-MANN, a citizen of the United States, residing at Philadelphia, county of Philadelphia, State of Pennsylvania, have invented a new and useful Cutting Machine with a Safety Feed, of which the following is a specification.

My invention comprehends a novel construction and arrangement of a cutting machine with a safety feed, and, although not limited to such use, it is especially adapted to be employed as a meat cutter.

In the preparation of a number of meat products it is necessary to use meat containing the sinews, and, in order to cut the meat of this character, a shear cut is usually employed.

There has been on the market for many years and the public now has the right to manufacture a meat cutting machine in which the meat is fed under pressure towards an apertured disc, in proximity to which cutting knives are adapted to revolve in order to form a shear cut on the meat or other material which is being cut.

Machines of this character are provided with a vertically disposed hopper, and, in order to cause the meat to be fed downwardly into the working zone of the feed screw, it is customary for the operator to push the meat downwardly with a stick toward the discharge opening of the hopper, since in practice the meat will not feed downwardly by its weight alone.

In the operation of machines of this character, it is necessary, from a commercial view point, to employ cheap and unskilled labor, and, with labor of this character, it has been a comparatively frequent occurrence for the workman to feed the meat to the hopper with his hand, with the result that his fingers became caught in the feed screw and were cut off, or he has received as well serious injuries to his hand and arm.

Many attempts have been made to devise a practical automatic feed which will effect the feed of the meat to the feed screw, but, in so far as I am aware, they have all been open to many serious objections, such as for example, increasing the overall height of the machine, thus rendering it more difficult for the workmen to place the meat in the hopper; or obstructing the hopper with a vertically disposed feed screw which also renders it difficult to fill the hopper, and there was at all times difficulty in maintaining the machine in a sanitary condition.

One of the main objects of my present invention is to devise means to automatically feed the material into the working zone of the feed screw, preferably through the side wall of the casing which surrounds the feed screw.

It will be understood from the foregoing that my invention further comprehends novel means to automatically feed the material through the casing between its top and bottom to bring it into the working zone of the feed screw, of a cutting machine of the character hereinbefore set forth.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 is a top plan view of a cutting machine with a safety feed embodying my invention.

Figure 2 is a side elevation of another embodiment of the invention in which the hopper portion is integral with the end plate of the receiving casing.

Figure 3 is a modification of the hopper and feeder trough structure in which the end plate of the trough and the hopper are made integral.

Figure 4 represents an end elevation of the machine.

Figure 5 is a side elevation of the machine.

Similar numerals of reference indicate corresponding parts.

Referring to the drawings:

1 designates the supporting framework of a cutting machine with a safety feed embodying my invention. 2 designates the casing or cylinder of the machine, which, at its outer end is provided with a perforated plate or disc 3 which is secured in place by a coupling 4. 5 designates a feed screw which is of the well known pressure type, as shown in Figure 1, having the corrugations at its inward end wider than those at the outward end so that the material is fed under pressure through the apertures of the disc 3, and cutting knives of the well known construction, which I have not deemed it necessary to show, revolve in close proximity to the disc 3 in order to make a shear cut on the material being fed. The casing 2 at its inner end is provided in the usual manner with an annular flange 6 which is secured by means of fastening devices 7 to a similar flange 8 connected with the bearing 9.

10 designates the main driving shaft which is operatively connected to the feed screw 5 in the usual manner so that the latter can be removed when it is desired to clean the machine. The main shaft 10 is journalled in the bearing 9 and a bearing 11, and is provided with a fixed pulley 12 and a loose pulley 13 so that it can be driven by means of a belt, which, in turn, is driven by any desired source of power.

The foregoing machine is a well known construction and is considered a standard machine for the work for which it is intended and has been on the market a great many years for performing a shear cut on the material.

In order to provide means to automatically feed the material which is to be cut to the working zone of the feed screw 5, I have devised novel feeding means which will now be described.

The shaft 10 has fixed to it a gear 14 which meshes with a gear 15 journalled in a bracket 16. The gear 15 has connected with it a gear 17, which meshes with a gear 18 fixed to a shaft 19, journalled in bearings carried by a container or receptacle 21.

The shaft 19 is provided with a gear 22, which meshes with a gear 23, fixed to a shaft 24, the inner end of which is of polygonal contour, as indicated at 25, in order that it can pass through a polygonal shaped aperture 26 of a feed conveyor 27. This feed conveyor 27 consists of a helical blade, and, as will be understood by reference to Figures 1 and 2, it does not have a solid center but is open throughout its longitudinal axis.

The container 21 is provided with the apertured end plates 28 and 29, which are fixed to the body portion, the bottom of which is rounded. The aperture of the end plate 28 is closed by means of a door 30, which is hinged at 31 to the end plate 28. This door is secured in closed position by means of fastening devices 32, see Figure 4.

33 designates the hopper for the casing 2 which in the standard type of machine which I have before explained is always vertically disposed, but in accordance with my invention this is turned so that it is preferably substantially laterally or horiontally disposed instead of vertically. This hopper 33 is connected with the end plate 29 of the container 21 by means of the brackets 34 which are secured in position by means of the fastening devices 35. The container 21 is preferably provided with an additional support 36. The door 30 has connected with it a bracket 37, which with the door forms the journals for the shaft 24. The gearing is covered by a guard plate 38, see more particularly Figures 1 and 4 so that the operator cannot be injured by such gearing.

In some types of machines, the hopper is detachable from the casing 2, and, in the embodiment shown in Figure 3, I have illustrated the manner in which my invention can be employed in cutting machines in which the hopper is detachable. For this purpose, I have shown the hopper 39 and the end plate 40 which corresponds to the end plate 29 as being integral.

The operation of my novel cutting machine with a safety feed will now be apparent to those skilled in this art and is as follows:

Assuming that the main driving shaft 10 is being driven, it will be apparent that the feed conveyor is also being driven. The operator places the meat or other material into the container 21 which latter is preferably elongated so that the material can easily be placed therein, and this container may be of any desired dimension.

The feed conveyor 27 is driven by reduction gearing so that it operates at a comparatively slow feed. The forward end of this conveyor 27 extends into the hopper in proximity to the feed screw 5 so that the material is fed through the hopper and into the working zone of the feed screw with a slow and gradual feed and with very little pressure being placed on the material. As soon as the material comes into working zone of the feed screw 5, it is fed forwardly by such feed screw and is forced under pressure through the apertures of the plate 3 and against such plate, and is cut by the cutting knives.

If too much material is fed towards the feed screw 5, it will be apparent that it will work back through the hollow center of the feed conveyor 27 and be again fed forwardly by such feed conveyor 27. The material after being cut passes from the casing 2 and is discharged into a truck from which it can be placed again into the container 21 if it is desired to reduce the material to a finer degree.

The type of feed conveyor employed renders it unnecessary for the workmen to touch the meat in the conveyor or other material in the container 21, and, even should he place his hand into contact with this conveyor 27, he cannot be injured thereby, and his hand cannot be brought into the working zone of the feed screw 5.

If it is desired to clean the machine, the fastening devices 32 are released and the door 30 swung into the position seen in dotted line in Figure 1. The feed conveyor 27 can be removed through the opening uncovered by the door or closure 30 and the feed screw 5 can be removed in the usual manner, so that the feed conveyor, the feed screw 5, the container 21 and the casing 2 can be cleansed by means of hot water or steam, so that the machine can at all times be maintained in a sanitary condition.

Special attention is directed to the fact that in accordance with my present invention the material is automatically fed through the side wall of the casing 2 to bring it within the working zone of the feed screw 5.

It is not practical to feed the material into the bottom of the casing 2 due to the pressure which would have to be exerted on the material.

In so far as I am aware, I am the first in the art to devise means to automatically feed meat through the side wall of the casing of a cutting machine for forming a shear cut, and it is, therefore, to be understood that I desire to have my claims interpreted with corresponding scope.

In accordance with my invention, I have decreased the overall height of the casing 2 and hopper 33, so that the material does not have to be lifted as high as has heretofore been necessary in meat cutting machines of this character.

I also have the great advantage of preventing injury to the workman or operator, and the material is automatically fed without rendering it necessary for the operator to give any aid whatever to the feeding operation or to contaminate the meat by touching it with his hands.

The hopper can open through either side wall of the casing 2 depending upon the direction in which the feed screw 5 is intended to be driven and in some machines the feed is on one side of the casing while in other types of machines the feed will be on the opposite side of the casing, as will be apparent to those skilled in this art.

It will be apparent that the safety feed herein disclosed can be readily applied to standard cutting machines of the type herein set forth without any change in their construction and operation. All that it is necessary to do is to give the casing 2 a quarter turn and secure it in position and connect the hopper with the discharge outlet from the container 21. The main driving shaft 10 has applied to it the gear 14 which is operatively connected with the shaft 24 to drive it.

It will now be apparent that I have devised a new and useful cutting machine with a safety feed which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In combination with a meat cutting machine having a casing and feed screw therein and provided with a side feed opening, an open trough shaped feed container having an opening communicating with said side feed opening, a helical feed conveyor disposed within said trough shaped container and having its inner end extending to a point adjacent said feed screw, and means to actuate said conveyor.

2. In combination with a meat cutting machine having a casing and feed screw therein and provided with a side feed opening, an open trough shaped feed container having an opening communicating with said side feed opening, a helical feed conveyor disposed within said trough shaped container and having its inner end extending to a point adjacent said feed screw, and means to actuate said conveyor, said conveyor having one end detachably connected with said actuating means.

3. In combination with a meat cutting machine having a casing and feed screw therein and provided with a side feed opening, an open trough shaped feed container having an opening communicating with said side feed opening, a helical feed conveyor disposed within said trough shaped container and having its inner end extending to a point adjacent said feed screw, a closure for said container, a shaft journalled in said closure and with which one end of said conveyor is detachably connected, and means to actuate said shaft.

4. In combination with a meat cutting machine having a casing and feed screw therein and provided with a side feed opening, an open trough shaped feed container having an opening communicating with said side feed opening, a helical feed conveyor disposed within said trough shaped container and having its inner end extending to a point adjacent said feed screw, a removable closure for said container, a shaft extending through said closure and with which one end of said conveyor is detachably connected, said conveyor being removable through the opening uncovered by said closure when removed, and means to actuate said shaft.

5. In combination with a meat cutting machine having a casing and feed screw therein and provided with a side feed opening, an open trough shaped feed container having an opening communicating with said side feed opening, a helical feed conveyor having a hollow center, disposed within said trough shaped container, and having its inner end extending to a point adjacent said feed screw, means to drive said feed screw, and means operatively connected with said feed screw driving means to actuate said conveyor.

CHARLES W. HOTTMANN.